(No Model.)

F. E. HALL.
PROCESS OF MANUFACTURING WATER PROOF FABRICS.

No. 320,781. Patented June 23, 1885.

WITNESSES:
Chas. S. Gooding
E. A. Phelps

INVENTOR:
Frank E. Hall,
by N. N. Spencer, attorney

UNITED STATES PATENT OFFICE.

FRANK E. HALL, OF BOSTON, MASSACHUSETTS, ASSIGNOR TO THE HALL RUBBER COMPANY, OF SAME PLACE.

PROCESS OF MANUFACTURING WATER-PROOF FABRICS.

SPECIFICATION forming part of Letters Patent No. 320,781, dated June 23, 1885.

Application filed December 29, 1884. (No model.)

*To all whom it may concern:*

Be it known that I, FRANK E. HALL, a citizen of the United States, residing at Boston, in the county of Suffolk and State of Massachusetts, have invented certain new and useful Improvements in the Process of Manufacturing Water-Proof Fabrics; and I do hereby declare that the same are fully described in the following specification, and illustrated in the accompanying drawings.

This invention is in the nature of an improvement upon or simplification of the process set forth and claimed in the Letters Patent No. 299,638, granted to me June 3, 1884, for process of manufacturing gossamer waterproof cloth. In said patent I described, as a part of my invention, the coating of that part of the fabric designed for the lining of the composite sheet by passing said lining, while in the form of an endless band, through a machine adapted to spread thereon a thin layer of adhesive rubber compound. To this coated lining the coated fabric designed for the outer face of the goods was caused to adhere by pressure, the two for that purpose passing between rollers, while one of the fabrics was in the form of an endless belt, the composite band thus formed being subsequently severed at the desired point and removed from the machine.

My present invention includes, as the first part of my improved process, this rubber coating of one or both the fabrics while in the form of an endless band. The second step is the severing of such band or bands to reduce the two fabrics to the strip or roll form, and the third is the uniting of said strips into a composite fabric by bringing their rubber-coated surfaces together and passing said strips endwise between pressure devices to secure a perfect union.

Figure 1:
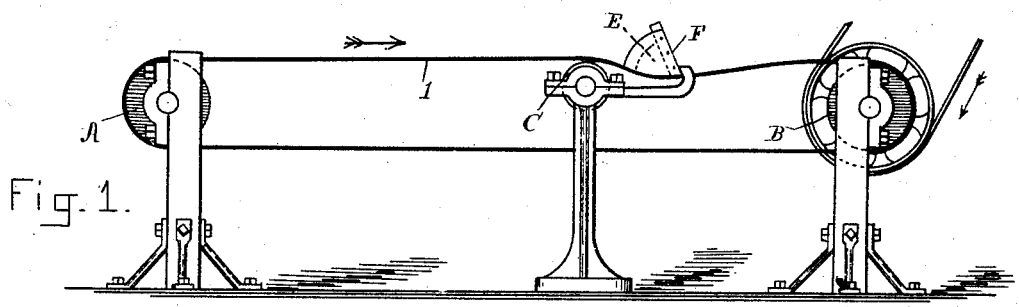
Figure 2:
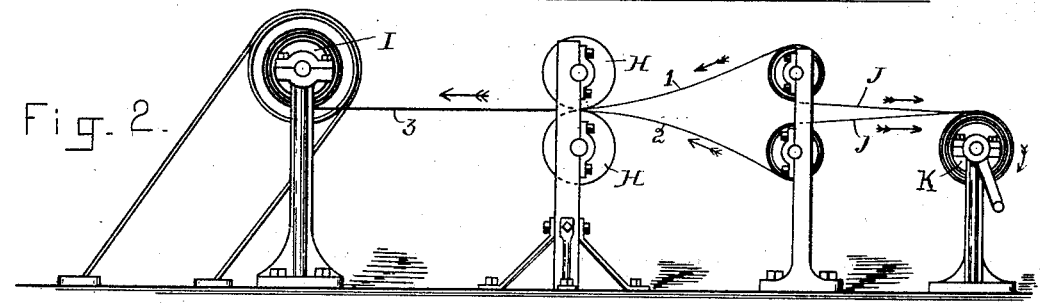
Figure 3:
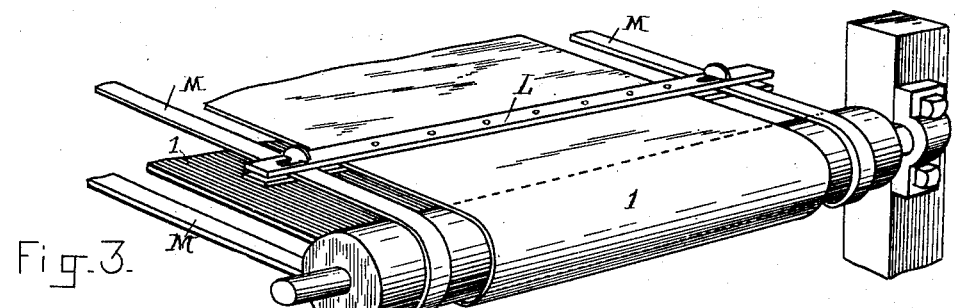
Figure 4:
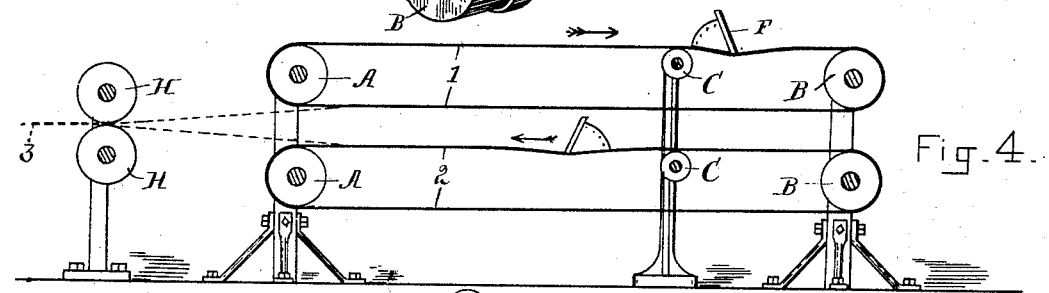
Figure 5:
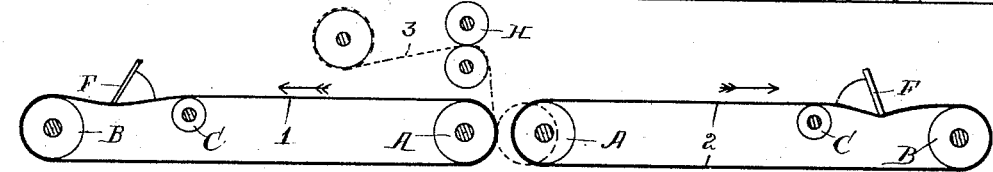

The drawings represent simple forms of mechanism by which my process may be carried on, Figure 1 showing an elevation of the endless-band machine, and Fig. 2 a vertical section of a machine for uniting the coated strips. Fig. 3 is a perspective view illustrating a device for supporting the end of the strip after the band is cut. Fig. 4 shows a double coating machine provided with means of uniting the strips after the bands are severed, and Fig. 5 is a modification thereof.

The two fabrics 1 and 2 to be united are rapidly and evenly coated on one side in the manner commonly employed in the preparation of gossamer water-proof fabrics. The material extends, in the form of an endless band, around the two rollers A and B, between which is a supporting-roller, C, placed near the point where the rubber is applied. The rubber compound, in a semi-liquid state, is poured upon the upper surface of the band, as shown at E, and the knife or spreader F prevents the movement of the fabric from carrying with it more than a thin film of the compound. By continuing the movement of the band ten or fifteen successive coats are applied, after which the surplus compound is removed, the rubber surface being elsewhere smooth and even. Each band is then severed where originally joined, and may be rolled up and removed to another machine, care being taken to prevent two rubber-coated surfaces from coming into contact prematurely. To this end a long smooth cloth, to which the rubber will not adhere, may be rolled in with the coated strip.

Fig. 2 represents a suitable machine for uniting the two strips 1 and 2, which are shown as being uncoiled from the rollers G and passing with their coated surfaces in contact under pressure between the rollers H, the composite fabric 3 so formed being coiled up on the roller I, and removed to be cured in the sun or otherwise. The cloths J, which had been rolled in with the strips, may be received upon a roller or rollers, K.

Any convenient means of supporting the body and free end of the coated strip after it is severed and while being rolled up may be employed. I prefer the device shown in Fig. 3, in which the end of the strip is clamped between two cross slats, L, carried by two narrow belts, M, placed at the sides of the band of fabric on the rollers A and B, and moving with them. The strips are only applied to the belts when the fabric is completely coated and ready to be removed. They seize the band, and when it is severed support its free end, and move with it while the other end is being rolled up, thus keeping it from dropping down or becoming wrinkled. By the use of these devices, in introducing the strips preparatory to coating, the apron usually employed may be dispensed with.

It is by no means essential that the coated strips be rolled up and removed from the machine, since they may pass together, in the strip form and endwise, directly to the pressure-rollers, as indicated in Fig. 4, where both bands are coated simultaneously in the same machine. The two bands 1 and 2 being severed, and one end of each being held so as not to drop down, the other ends are brought together with their coated surfaces smoothly in contact, and are passed thus between the rollers H, by which act they are permanently united.

Instead of coating the two bands on one machine, one above the other, as in Fig. 4, two frames may stand end to end, as in Fig. 5, and when the bands, which have moved in opposite directions around their rollers, are sufficiently coated, one frame may be moved toward the other until the coated bands surrounding their contiguous rollers come into actual intimate contact.

Instead of moving the frames endwise, the end roller of one may be in a higher plane than the adjacent end of the other, and when the two fabrics are to be united these rollers may be brought into contact by causing them to approach the same horizontal plane. Thus the supporting-rollers may serve also as pressure-rollers to unite the strips.

I claim as my invention—

The herein-described process of making double-textured water-proof cloth, consisting in first coating the two fabrics, while one or both of them is in the form of an endless band, with a thin solution of adhesive and water-proof material, then severing said fabric bands to reduce them to the strip or roll form, and subsequently uniting the two by pressure to form a composite sheet, substantially as set forth.

In testimony whereof I hereto affix my signature in presence of two witnesses.

FRANK E. HALL.

Witnesses:
E. A. PHELPS.
A. H. SPENCER.